United States Patent [19]

Santer

[11] Patent Number: 4,634,738
[45] Date of Patent: Jan. 6, 1987

[54] HIGH SOLIDS CURABLE RESIN COATING COMPOSITION

[75] Inventor: J. Owen Santer, East Longmeadow, Mass.

[73] Assignee: Monsanto Company, St. Louis, Mo.

[21] Appl. No.: 705,590

[22] Filed: Feb. 26, 1985

[51] Int. Cl.$^4$ ............................................. C08L 61/28
[52] U.S. Cl. ............................ 525/162; 427/385.5; 427/388.3; 427/409; 428/458; 428/460; 428/461; 525/157; 525/161; 525/443
[58] Field of Search ............... 525/443, 162, 161, 157; 428/458, 460, 461

[56] References Cited

U.S. PATENT DOCUMENTS

| | | | |
|---|---|---|---|
| 3,480,693 | 11/1969 | Hill et al. | 525/443 X |
| 4,374,164 | 2/1983 | Blank | 525/162 X |
| 4,440,913 | 4/1984 | Sugiura et al. | 525/443 |

Primary Examiner—Theodore E. Pertilla
Attorney, Agent, or Firm—Fishman & Dionne

[57] ABSTRACT

A high solids curable polymer resin coating composition comprising mixed ether aminoplasts containing $C_8$ to $C_{12}$ alkoxymethyl and methoxymethyl groups and a hydroxy-containing resin. The coating composition provides improved intercoat adhesion and cross-link density. Examples of the hydroxy-containing resin are acrylic, alkyd and polyester resins.

10 Claims, 2 Drawing Figures

DYNAMIC MECHANICAL ANALYSIS AUTOMATED RHEOVIBRON $$\text{STORAGE MODULUS} = E' = \frac{\sigma_0 \cos \delta}{\varepsilon_0}$$

$$\text{LOSS MODULUS} = E'' = \frac{\sigma_0 \sin \delta}{\varepsilon_0}$$

$$\text{LOSS TANGENT} = \frac{E''}{E'} = \tan \delta$$

HIGH SOLIDS CURABLE RESIN COATING COMPOSITION

BACKGROUND OF THE INVENTION

This invention relates to high solids curable polymer resin coating compositions containing amino cross-linking agents and particularly to such compositions containing alkoxymethyl melamine cross-linking agents.

High solids polymer resin coating compositions cross-linked with etherified amino resins are finding increasing use for general industrial and appliance applications and in automotive top finishes. Such coating compositions when compared to lower solids coatings compositions often reduce solvent emission and are more acceptable from an environmental standpoint. In industrial applications when coatings are cured by baking, monomeric methoxymethyl aminoplast resins have achieved widespread acceptance as cross-linking agents. While it has been found that the higher cross-link density achieved more quickly with the chemically efficient methoxymethyl aminoplast resin results in highly resistant films and finishes, it has also been observed that recoating of a baked coating with the same coating system is very difficult. Without any sanding, etching, or other treatment of the already coated part no effective intercoat adhesion is achieved. In many coating operations, recoating is necessary for various reasons. For example, coated parts may be damaged during assembly or multiple coatings as in the case of two-tone colored automobiles may be desired. In multiple coating operations, the part is first coated with one color which is subsequently baked. The area not to be painted with a second color is masked and then the second color is applied on the remaining uncovered area of the part and cured. Although some high solids coating compositions cross-linked with methoxymethyl aminoplast can function satisfactorily in such an operation under controlled laboratory bake conditions, in actual operation they fail because of decreased control of the curing cycle. It has been found that baking of the first coat at higher temperature for longer time periods during production than should normally occur reduces the intercoat adhesion of the second coat with more pronounced losses occurring at low temperature rebake conditions. It has been shown that intercoat adhesion improves with the use of mixed ether melamine formaldehyde cross-linking agents. For example, mixed methylated n-butylated melamine formaldehyde resin has been shown to provide improved intercoat adhesion. In addition, U.S. Pat. No. 4,374,164 shows that a high solid composition containing a mixed methylated isobutylated melamine resin as cross-linking agent gives improved inter coat adhesion.

However, the mixed methylated isobutylated cross-linker requires about 2 to 3 isobutyls per melamine to effectively improve the intercoat adhesion of the coating system. The increased isobutyl content and the decreased methyl content per melamine nucleus cause the coating system to cure more slowly. The slower cure rate is indicated by a lower cross-link density and poorer weatherability as indicated by poorer UV stability and chemical resistance.

It has now been found that further improvement in intercoat adhesion can be achieved at low temperature re-bake conditions with a high solids composition using mixed alkyl ether aminoplasts containing $C_8$ to $C_{12}$ alkyl ether groups. Furthermore, a higher cross-link density can be achieved, since fewer $C_8$ to $C_{12}$ alkyl ether groups per aminoplast are required than isobutoxy to provide improved intercoat adhesion. The compositions comprise a curable polymer resin coating composition comprising a. a hydroxy-containing resin and b. A mixed ether aminoplast of degree of polymerization in the range of about 1 to about 3, comprising nuclei selected from the group consisting of melamine, acetoguanamine, adipoguanamine and benzoguanamine and attached thereto alkyloxymethyl groups in the range of about $2n-2$ to about $2n$ per nucleus where n is the number of amino groups per nucleus, the alkoxymethyl groups being selected from $C_8$ to $C_{12}$ alkyloxymethyl and methoxymethyl groups in a ratio within the range of about 0.2 to about 0.5 $C_8$ to $C_{12}$ alkoxymethyl group per methoxymethyl group.

THE FIGURES

THE AMINOPLAST

Figure 1:
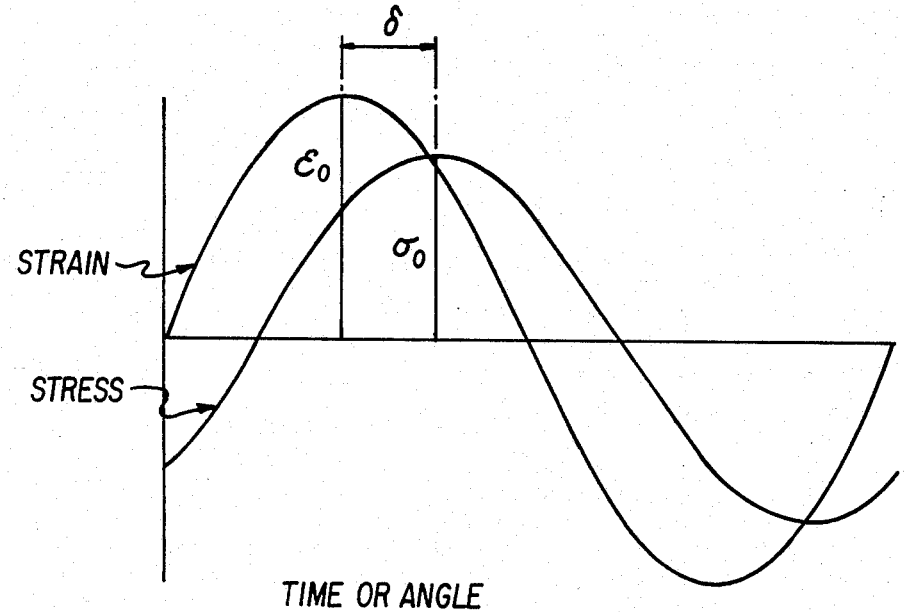
FIG. 1 is a plot of Time versus Stress and Strain measured in Dynamic Mechanical Analysis.

As used in this description, the term aminoplast refers to any of the large number of alkoxylated amino resins which are employed in the art of surface coatings. Such amino resins are characterized as being soluble in common solvents and are distinguished from thermosetting amino resins which are employed in molding or casting compositions. The aminoplasts which are suitable for the purpose of this invention are the alkoxymethyl derivatives of polyamino nuclei such as melamine, acetoguanamine, adipoguanamine, and benzoguanamine.

The alkoxymethyl amino triazines are substantially completely methylolated polyamino triazines substantially fully etherified with alcohol. They can be prepared by reaction of the polyamino triazine with formaldehyde to methylolate the amino groups and the methylolated groups are then etherified by reaction with alcohol. The mixed ethers of this invention can be prepared by transetherifying a polyalkoxy methyl melamine with a $C_8$ to $C_{12}$ alcohol or a mixture of such alcohols. The etherified methylolated amino triazines are liquid and are essentially monomeric or at most oligomeric with an average degree of polymerization of no more than about 3, the amino triazine rings being joined by methylene or methylene ether bridges. Thus the etherified amino triazines within the scope of the invention possess a ratio of amino triazine to combined formaldehyde in the range of about $1:(2n-1)$ to about $1:2n$ where n is the number of amino groups per triazine ring and possesses a ratio of amino triazine to alkyl ether groups in the range of about $1:2n-2$ to about $1:2n$. The preferred amino triazine is melamine since it has three amino groups per ring and is potentially hexafunctional. Thus the most preferred amino triazine compounds are the alkoxy methylmelamines in which the combined ratio of melamine to formaldehyde is in the range of about 1:5 to 1:6 and the combined ratio of melamine to alkoxy groups is in the range of about 1:4 to about 1:6, and the degree of polymerization is the range of about 1.5 to about 2.5 wherein the combined ratio indicates the overall molar ratios as indicated by bulk analysis.

The alcohols suitable for the etherification of the methylol melamine are alkyl alcohols or mixtures of alkyl alcohols. The combined ratio of the $C_8$ to $C_{12}$ alcohol to methylol should be in the range of about 0.2 to about 0.5.

HYDROXY-CONTAINING RESIN

The hydroxy-containing resin can be one of a number of commercially available resins. For water reducible resins, the hydroxy-containing resin should have a hydroxy content of from about 1.3 weight percent to about 10 weight percent, preferably about 2.0 to about 6.0 weight percent. Hydroxy content is defined as parts by weight hydroxy groups per 100 parts by weight of hydroxy-containing resin solids. Thus resin having one equivalent of hydroxy groups per 100 parts of resin would have a hydroxy content of 17 weight percent. For water-reducible resins, the hydroxy-containing resin has an acid number of at least 2 and preferably in the range of about 6 to about 12 and may be stabilized in aqueous dispersion by neutralization with ammonia or with a volatile amine such as dimethylethanolamine.

Examples of suitable hydroxy-containing resins are acrylic, and polyester resins which include the alkyd resins as are described below.

THE ACRYLIC RESINS

The acrylic resin which can be used to prepare the coating composition is any of a number of commercially available hydroxy-containing acrylic resins. The acrylic resin is a polymer of at least one ester of an alpha-olefinic monocarboxylic acid having the general formula:

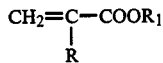

wherein R is either hydrogen or a lower alkyl group of from 1 to 4 carbon atoms, and $R_1$ represents a hydroxy alkyl of from 1 to 18 carbon atoms, and one or more of the comonomers of the formula:

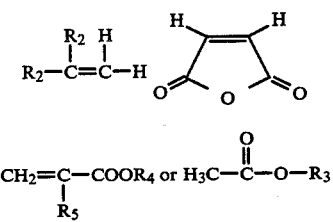

wherein
$R_2$ is phenyl, nitrile, H, $CH_3$ or $CH_2OH$;
$R_3$ is an alkyl of 2 or 3 carbon atoms;
$R_4$ is an alkyl of 1 to 18 carbon atoms; and
$R_5$ is H, or an alkyl group of 1 to 4 carbons.

Examples of hydroxy esters of alpha-olefinic mono carboxylic acids which may be used in the present invention include hydroxyethyl acrylate, hydroxybuty acrylate, hydroxyethyl methacrylate, hydroxybutyl methacrylate and hydroxy propyl acrylate.

Examples of the comonomers which may be used in the acrylics of the present invention are allyl alcohol, glycidyl methacrylate, styrene, α-methyl styrene, acrylic acid, methacrylic acid, acrylonitrile, maleic anhydride, allyl acrylate, vinyl acrylate, allyl acetate, vinyl acetate, methyl acrylate, ethyl acrylate, propyl acrylate, isopropyl acrylate, butyl acrylate, hexyl acrylate, octyl acrylate, 2-ethyl hexyl acrylate, cyclohexyl acrylate, decyl acrylate, stearyl acrylate, methyl methacrylate, methyl alpha-ethyl acrylate, ethyl methacrylate, butyl methacrylate, butyl alpha-ethyl acrylate.

THE ALKYD RESINS

The alkyd resins which can be used in preparing the compositions of this invention include those types normally used in baking or air drying applications. These resins can contain up to about 45 weight percent of an oil or fatty acid. When the fatty acid or oil concentration is increased above the 45 weight percent level cure response is diminished and the resulting films are soft and subject to mar and solvent attack. However, alkyl resins can be prepared which contain no fatty compound and are based upon polyols and polyacids only. These alkyd resins or oil-less alkyds are especially useful for exterior applications and have a high degree of flexibility, adhesion, and possess unique elongation properties. Preferably, though, the fatty compound should be present in an amount equal to about 20 to about 45 weight percent of the toal alkyd resin solids with the most preferable range being about 35 to 45 weight percent.

When a fatty compound is present in the alkyd resins of this invention, it can comprise any of the fatty acids or oils ordinarily used in preparing alkyd resins. Included are the following oils and their respectively derived fatty acids: tall, safflower, tung, tallow, soya, corn, linseed, poppyseed, castor, dehydrated castor, perilla, cocoanut, oiticica, and the like. Of special usefulness are those fatty compounds wherein the fatty acid portion contains from 12 to 24 carbon atoms per molecule.

An additional component of the alkyd resins of this invention is a polyol or a mixture of polyols. Among the polyols which can be utilized are those normally used in producing alkyd resins including pentaerythritol, glycerine, trimethyol propane, trimethyol ethane and the various glycols such as neopentyl, ethylene and propylene. Preferable among the above types of polyols are triols or mixtures containing a major amount of a triol and a minor amount of tetra-alcohol.

Typical of the carboxylic acids in addition to the aforementioned fatty acids incorporated into the alkyd resins are phthalic anhydride, isophthalic acid, adipic acid, azelaic acid, benzoic acid, etc. These acids can readily be replaced by any of the additional acids normally used in alkyd resin processing. The preferred system in addition to including the aforementioned preferred levels of a fatty compound contains an aromatic dibasic acid or a mixture of such aromatic acid with an aliphatic dibasic acid.

THE POLYESTER RESIN

The polyester which can be used to prepare the coating composition of this invention may be saturated, unsaturated or oil-modified such as those polyesters well known in the surface coating art. Polyesters are prepared by reacting a polyhydric alcohol (polyol) and a polybasic acid.

Such polyols include ethylene glycol, propylene glycol, butylene glycol, diethylene glycol, dipropylene, glycol, triethylene glycol, neopentyl glycol, trimethylene glycol, polyethylene glycol, polypropylene glycol, 1,5-pentanediol, trimethylolethane, trimethylolpropane, glycerol, 1,2,6-hexanetriol, pentaerylthritol, sorbitol, mannitol, methyl glycoside, 2,2-bis(hydroxyethoxyphenyl)propane, 2,2-bis(beta-hydroxypropoxyphenyl)-propane and the like. Mono-functional alcohols may also be employed to supplement the other polyols and to control the molecular weight. Useful alcohols include those having a hydrocarbon chain comprising from about 3 to about 18 carbon atoms.

The acid component of such polyesters may include unsaturated acids such as maleic acid, fumaric acid, itaconic acid, citraconic acid, glutaconic acid, mesaconic acid, and the like, and their corresponding anhydrides where such anhydrides exist. Other polycarboxylic acids which may be utilized include saturated polycarboxylic acids such as succinic acid, glutaric acid, adipic acid, pimelic acid, suberic acid, azelaic acid, sebacic acid, and the like. Certain aromatic polycarboxylic acids and derivatives thereof may also be useful; for example, phthalic acid, tetrahydroxyphthalic acid, hexahydroxyphthalic acid, endomethylenetetrahydroxyphthalic anhydride, tetrachlorophthalic anhydride, hexachloroendomethylene tetrahydrophthalic acid, and the like. The term acid as used in this specification includes the corresponding anhydrides, where such anhydrides exist.

In many instances it is optional to include a fatty acid. These include saturated fatty acids such as decanoic, dodecanoic, tetradecanoic, hexadecanoic, octadecanoic, docosanoic, and the like. And in addition, unsaturated fatty acids may be used such as 9-octadecenoic, 9,12-octadecadieoic, 9,12,15-octadecatrienoic, 9,11,13-octadecatrienoic, 4-keto-9,11,13-octadecaterienoic, 12-hydroxy9-octadecanoic, 13-docosanoic, and the like.

THE COATING COMPOSITIONS

The components of the coating composition may be combined in various amounts to provide a curable composition. A curable coating is one which in the presence of heat or at ambient conditions forms a film having the characteristics of non-tackiness, hardness, chemical and solvent resistance acceptable for a particular application. The amount of aminoplast is selected to provide a sufficient concentration of alkoxymethyl groups to provide an adequate degree of crosslinking by reaction with the hydroxy containing resin. Advantageously the concentration of alkoxymethyl groups is in the range of about 0.2 to about 2 per hydroxy group.

Solutions of adequate viscosity for coating applications, advantageously have total solids from 30 to 70 weight %. The preferred range is 40 to 60%.

In order to achieve low temperature curing using the compositions of this invention an acid catalyst can be used. Included are catalysts such as para-toluenesulfonic acid, methanesulfonic acid, butyl acid phosphate, hydrochloric acid, dodecylbenzene sulfonic acid, dinonylnaphthalene disulfonic acid and other organic and mineral acids having at least one active hydrogen group per molecule. Preferred among these catalysts are dodecylbenzene sulfonic acid and dinonylnaphthalene disulfonic acid. Catalyst concentration can range from about 0.25 to about 6% based on the total weight of the final coating depending upon the final end use. Thus when the coating is to be employed as a wood sealer as low as 0.25 to 1.0% catalyst can be employed. On the other hand when the coating is to be used as a topcoat more complete cure is required and therefore from 1 to 6 weight percent catalyst may be used. It should be noted that since most of the above acid catalysts are crystalline at room temperature, solutions in methanol or another solvent having a boiling point of less than about 63° C. may be used to facilitate handling.

The coating composition of the invention may be colored with a pigment usually employed for coloring of such coating compositions such as an organic pigment, carbon black, titanium dioxide, and aluminum flake.

The coating composition of the invention may also have incorporated therein other additives such as wetting agents, conditioning agents, flow control agents, ultra violet stabilizers, promoters for crosslinking and antioxidants.

The application of the coating composition of the invention may be executed by a conventional method. That is, the composition is applied by brushing, roller coating, spraying with compressed air or with a petroleum solvent of low boiling point or electrostatic spraying.

The coating composition of the invention may be applied to a variety of materials such as wood, paper, paper board, glass, metal, stone, plastics and cloth.

Practical and presently preferred embodiments of the present invention are shown for illustration only in the following examples wherein parts and percentages are by weight unless otherwise indicated.

TEST METHODS

Knoop Hardness Number (KHN) is determined by ASTM D-1474. The higher the value, the harder the coating.

Intercoat Adhesion—The panel is tested for intercoat adhesion by cutting a crosshatch of 0.32 centimeters on spacings at right angles and diagonally in one direction. Adhesive tape (#898, 25 mm wide available from 3M Company) is applied by pressing firmly and removing with an upward motion at medium speed. The amount of chipping, flaking or general poor adhesion is observed at the percent adhesion determined.

QUV is determined by ASTM G 53-83 with a UV cycle (light) of 16 hours/65° C. and a humidity cycle (dark) of 8 hours/60° C.

Gloss is measured at 60/20° according to ASTM-D573. Results are given in percent (%).

Distinction of Image (DOI) is determined by ASTM E430-78. The higher the value the better the image.

Humidity Resistance is tested by the General Motors Procedure Test Method 7.

Blistering is measured according to ASTM D-714 with the results reported in values of 1 to 10 wherein a value of 10 indicates no blistering. "T" indicates trace blistering and "MD" indicates medium dense blistering.

Figure 2:
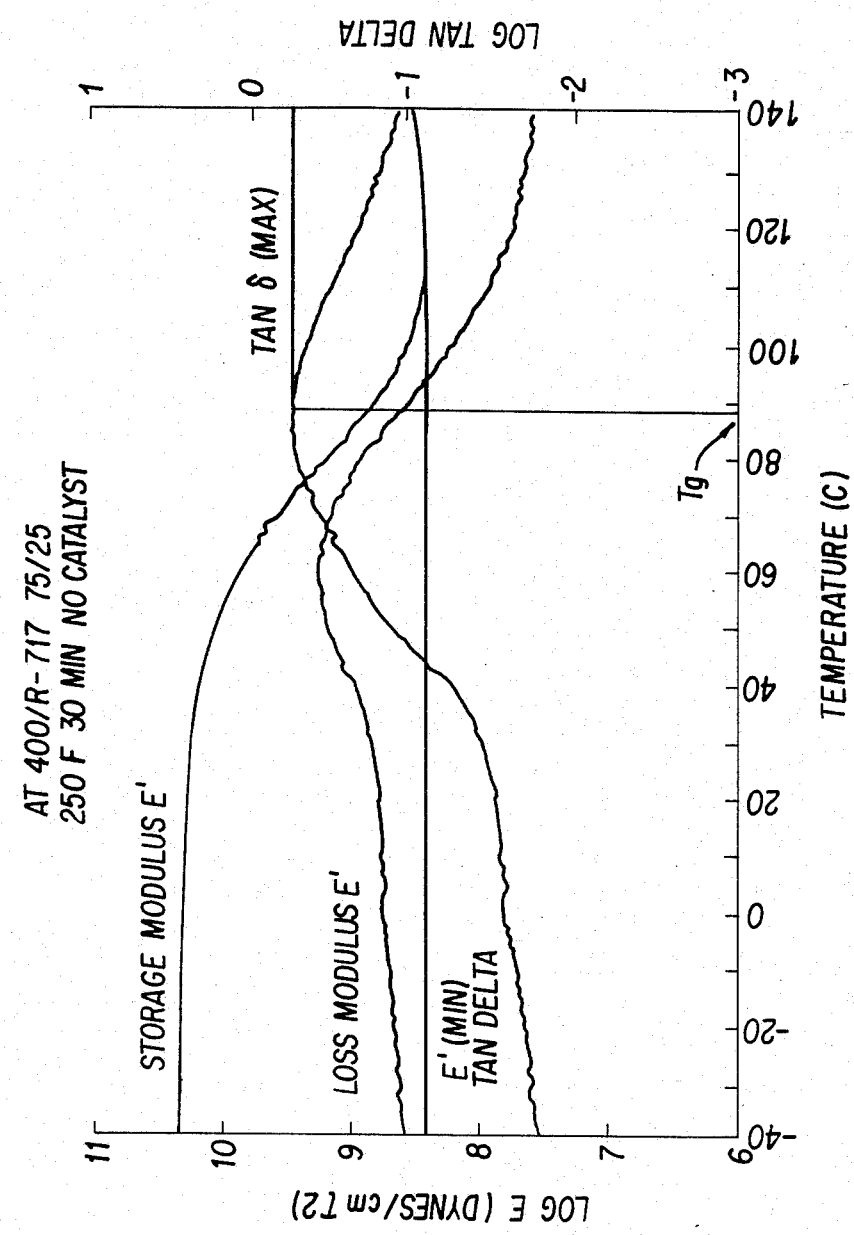
FIG. 2 is a plot of Temperature versus the log of Storage Modulus as measured in Dynamic Mechanical Analysis.

Dynamic Mechanical Analysis can be used to determine properties of cross-linked, thin films. In this method, an oscillating strain is imposed on a strip of free film and and Autovibron instrument determines the resulting stress. The lag of peak stress behind peak strain $\delta$ is a measure of viscous response of the sample. See FIG. 1. The maximum elongation $\epsilon_0$, maximum stress $\sigma$ and $\delta$ can be combined to obtain the elastic part of the response (the storage modulus) and the viscous part of the response (the loss modulus) as shown in FIG. 1. The ratio of loss modulus to storage modulus is called loss tangent (tan $\delta$). These dynamic properties are measured over a temperature range as shown in FIG. 2. FIG. 2 also identifies property values taken from the curves as a measure of cure. A higher storage modulus indicates higher cross-link density. Tan δ (max.) decreases as extent of cure increases.

The instrument used for the dynamic mechanical testing is an "Autovibron" sold by Imass, Inc., Box 134, Accord (Hingham), MA 02018. The frequency of oscillation, ω, was set at 11 Hz.

The method used to test the samples is described further in the following publications: S. Ikeda, "Dynamic Viscoelasticity of Coating Films," *Prog. Org. Coatings,*, 1, No. 3, 205 (1973), and K. Varadarajan, "Review of Dielectric and Dynamic Mechanical Relaxation Techniques for the Characterization of Organic Coatings" *J. Coatings Technol.*, 55, No. 704, 95 (1983).

EXAMPLES

Aminoplast A

Aminoplast A consists of a mixed alkoxymethyl melamine with a ratio of 2-ethylhexoxy:methoxy of about 1.0:5.0.

Aminoplast B

Aminoplast B consists of a mixed alkoxymethyl melamine with a ratio of 2-ethylhexoxy:methoxy of about 1.25:4.75.

Aminoplast C

Aminoplast C consists of a mixed alkoxymethyl melamine with a ratio of 2-ethylhexoxy:methoxy of about 1.5:4.5.

Aminoplast D (Utilized in U.S. Pat. No. 4,374,164)

Aminoplast D consists of a mixed alkoxymethyl melamine with a ratio of n-butoxy:2-methoxy of about 2.6:3.4.

Aminoplast E (Utilized in prior art commercial coating)

Aminoplast E consists of a mixed alkoxymethyl melamine with a ratio of isobutoxy:methoxy of about 3.6:2.4.

Acrylic Polyol

The hydroxy functional polyol used in the examples consists of a high solids clear acrylic polymer with a solids content of 48.0 weight percent, a hydroxyl number of 110, a viscosity of 30 seconds, #2 Fisher cup.

Catalyst

The catalyst is 40.8 weight % of dodecylbenzene sulfonic acid, blocked with dimethyl oxazolidone in methanol solution. The catalyst is charged with 1.2 weight % based on the total binder.

Base Coat

The base coat consists of 440.75 parts of the Acrylic Polyol (described above), 50.45 parts aminoplast solids, 8.8 parts catalyst and 38 parts of hydrocarbon solvent.

Control C-1 and C-2 and Examples 1 through 3

Examples 1 through 3 in comparison with C-1 and Examples 1 and 3 in comparison with C-2 (Table 1) demonstrate improved intercoat adhesion for coatings prepared with the mixed alkoxy methylmelamine coating compositions of this invention.

Examples 1, 2 and 3 and Controls C-1 and C-2 are prepared by spraying a 0.005 mm thick base coat at room temperature onto cold rolled steel panels treated with zinc phosphate and primed with a pigmented epoxy coating about 0.01 mm thick. The base coat is devolatilized at room temperature for 2 to 3 minutes, then the first coating of the acrylic clear coat as described in Table 1 is sprayed onto the panel to a thickness of 0.013 to 0.015 mm and devolatilized at room temperature for 2 to 5 minutes. The panel is then baked for 30 minutes at 141° C. A second coating of acrylic clear coat is sprayed onto the panel to a thickness of 1.3 to 1.5 mils and devolatilized at room temperature for 2 to 5 minutes. The panel is re-baked for 30 minutes at the temperature indicated in Table 1. The panels are then tested for Knoop hardness and intercoat adhesion. The cure cycle of 141° C. for the first coat and 113°–115° C. for the second coat was selected as a very severe test cycle which in the laboratory simulates conditions encountered in a plant.

TABLE 1

| ACRYLIC CLEAR COAT COMPOSITION AND EVALUATION | | | | | |
|---|---|---|---|---|---|
| | EX 1 | EX 2 | EX 3 | C-1 | C-2 (U.S. Pat. No. 4,374,164) |
| Acrylic Polyol | 35.7 | 35.7 | 35.7 | 35.7 | 35.7 |
| Catalyst Solution | 0.96 | 0.96 | 0.96 | 0.96 | 0.96 |
| Aminoplast A | 13.4 | | | | |
| Aminoplast B | | 13.3 | | | |
| Aminoplast C | | | 13.3 | | |
| Aminoplast D | | | | 13.3 | |
| Aminoplast E | | | | | 13.5 |
| Re-bake at 113° C. | | | | | |
| Dry Film Thickness (mils) | 3.3 | 3.2 | 3.2 | 3.3 | 3.2 |
| Knoop Hardness | 5.5 | 4.8 | 3.5 | 5.1 | 6.9 |
| Intercoat Adhesion (%) | 85 | 50 | 90 | 0 | 75 |
| Re-bake at 116° C. | | | | | |
| Dry Film Thickness (mils) | 3.3 | 3.3 | 3.3 | 3.3 | 3.3 |
| Knoop Hardness | 6.6 | 6.2 | 5.1 | 10.4 | 8.7 |
| Intercoat Adhesion (%) | 100 | 95 | 100 | 5 | 95 |

TABLE 2

| | EX 4 | C-3 | C-4 |
|---|---|---|---|
| Acrylic Polyol | 143.1 | 143.1 | 143.1 |
| Catalyst Solution | 3.8 | 3.8 | 3.8 |
| Aminoplast A | 53.06 | | |
| Aminoplast D | | 53.06 | |
| Aminoplast E | | | 54.37 |
| Xylene | 25 | 25 | 30 |
| Re-bake at 115° C. | 100 | 85 | 100 |
| Intercoat Adhesion | | | |
| Re-bake at 113° C. | 100 | 65 | 100 |
| Intercoat Adhesion | | | |
| Re-bake at 110° C. | 100 | — | 80 |

TABLE 2-continued

|  | EX 4 | C-3 | C-4 |
|---|---|---|---|
| Intercoat Adhesion Re-bake at 107° C. | 95 | — | 65 |
| Intercoat Adhesion |  |  |  |

Controls C-3 and C-4 and Example 4

Example 4 compared with Controls C-3 and C-4 (Table 2) demonstrates superior intercoat adhesion at low temperature re-bake (110° C. or lower) which are very severe test conditions. Example 4 and Controls C-3 and C-4 are prepared as Example 1 except that the first clear coat is re-baked at 121° C. for 30 minutes and the acrylic polyol contains 56% by weight solids. A sample identical to Example 4 is prepared, except that a mixture of $C_9$ to $C_{11}$ linear primary alcohols are used for etherification rather than 2-ethylhexanol and equivalent results to Example 4 are achieved.

Controls C-5 and C-6 and Example 5

Example 5 compared with Controls C-5 and C-6 (Table 3) demonstrates equivalent or superior ultraviolet stability and superior humidity resistance as indicated by gloss and blistering. Example 5 and Controls C-5 and C-6 are prepared by the method used in Example 4.

TABLE 3

| WEATHERABILITY DATA | | | |
|---|---|---|---|
|  | EX 5 | C-5 | C-6 |
| Acrylic Polyol | 143.1 | 143.1 | 143.1 |
| Catalyst Solution | 3.8 | 3.8 | 3.8 |
| Aminoplast A | 53.06 |  |  |
| Aminoplast D |  | 53.06 |  |
| Aminoplast E |  |  | 54.37 |
| Xylene | 25 | 25 | 30 |
| Re-bake at 82° C. |  |  |  |
| 20° Gloss | 87.6 | 86.5 | 88.7 |
| DOI | 77.2 | 89.4 | 86.0 |
| 7-Day |  |  |  |
| QUV-20% Gloss Humidity | 84 | 85 | 77 |
| 20% Gloss | 87 | 81 | 75 |
| Blistering | None | 9.5 T | 9.5 T |
| 10-Day |  |  |  |
| QUV-20% Gloss Humidity | 82 | 83 | 78 |
| 20% Gloss | 86 | 83 | 72 |
| Blistering | 9.5 T | 9.5 MD | 9.5 MD |

TABLE 4

|  | EX 6 | C-7 |
|---|---|---|
| Acrylic Polyol | 6.59 | 6.59 |
| Catalyst Solution | 0.33 | 0.33 |
| Aminoplast A | 3.07 |  |
| Aminoplast E |  | 3.07 |
| Xylene | 3.95 | 3.95 |
| Loss Tangent | 0.39 | 0.45 |
| Storage Modulus (dynes/cm$^2$) | $4.1 \times 10^8$ | $3.3 \times 10^8$ |

Control C-7 and Example 6

Example 6 compared to Control C-7 (Table 4) demonstrates improved cure. The lower loss tangent value and the higher storage modulus value both indicate improved cure properties. The samples are prepared by applying the coating composition to glass panels with a drawdown blade at about 0.005 mm dry film thickness. The samples are then cured at 121° C. for 30 minutes. The cured film is removed from the glass panel by soaking in water. The free film is cut into a strip 3.5 cm by 0.4 cm and tested according to the Dynamic Mechanical Analysis test described above.

We claim:

1. A curable polymer resin coating composition comprising
   a. a hydroxy-containing resin selected from the group consisting of acrylic and polyester hydroxy-containing resins containing about 1.3 to 10 weight percent hydroxy and an acid number in the range of 2 to about 12 and
   b. a mixed ether aminoplast of degree of polymerization in the range of about 1 to about 3, comprising nuclei selected from the group consisting of melamine, acetoguanamine, adipoguanamine and benzoguanamine and attached thereto alkyloxymethyl groups in the range of about 2n-2 to about 2n per nucleus where n is the number of amino groups per nucleus, the alkoxymethyl groups being selected from $C_8$ to $C_{12}$ alkyloxymethyl and methoxymethyl groups in the ratio within the range of about 0.2 to about 0.5 $C_8$ to $C_{12}$ alkoxymethyl group per methoxymethyl group.

2. The polymer resin according to claim 1 wherein the $C_8$ to $C_{12}$ alkyl group is 2-ethylhexyl.

3. The polymer resin according to claim 2 wherein the nucleus is melamine.

4. The polymer according to claim 1 wherein the degree of polymerization is in the range of about 1.5 to about 2.0.

5. A curable polymer resin coating composition comprising
   a. a hydroxy-containing resin selected from the group consisting of acrylic and polyester hydroxy-containing resins containing about 1.3 to 10 weight percent hydroxy and an acid number in the range of about 2 to about 12 and
   b. a mixed ether alkoxymethylmelamine, a degree of polymerization in the range of about 1.5 to about 2.5 and attached to the melamine or alkoxymethyl groups in the range of 2n−2 to about 2n per melamine where n is the number of amino groups per melamine, the alkoxymethyl group being selected from $C_8$ to $C_{12}$ alkoxymethyl and methoxymethyl groups in a ratio within the range of about 0.2 to about 0.5 $C_8$ to $C_{12}$ alkoxymethyl group per methoxymethyl group.

6. The polymer resin according to claim 5 where the $C_8$ to $C_{12}$ alkyl group is 2-ethylhexyl.

7. A polymer resin coating composition comprising
   a. a hydroxy-containing resin selected from the group consisting of acrylic and polyester resins containing about 1.3 to 10 weight percent hydroxy and acid number in the range of about 2 to about 12 and
   b. a mixed ether alkoxymethylmelamine with a degree of polymerization in the range of 1.5 to 2.5 and attached to the melamine or alkoxymethyl groups in the range of 2n−2 to about 2n per melamine where n is the number of amino groups per melamine, the alkoxymethyl groups being selected from 2-ethylhexoxymethyl and methoxymethyl in a ratio within the range of about 0.2 to about 0.5 2-ethylhexoxymethyl per methoxymethyl group.

8. An article coated with the coating composition of claim 1.

9. An article coated with the coating composition of claim 5.

10. An article coated with the coating composition of claim 7.

* * * * *